(12) United States Patent
Ray

(10) Patent No.: US 6,968,053 B1
(45) Date of Patent: Nov. 22, 2005

(54) ACOUSTIC SIGNAL TRANSFER DEVICE

(75) Inventor: Amar Nath Ray, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 501 days.

(21) Appl. No.: 10/167,740

(22) Filed: Jun. 12, 2002

(51) Int. Cl.$^7$ .............................................. H04M 1/24
(52) U.S. Cl. ............................... 379/357.03; 379/1.01; 379/27.01; 455/67.11
(58) Field of Search ............................... 379/444, 1.01; 455/67; 387/58; 219/736; 73/589, 149; 381/58; 361/600

(56) References Cited

U.S. PATENT DOCUMENTS 2,981,096 A * 4/1961 Carrell ........................ 73/589
6,456,717 B1 * 9/2002 Nowka et al. ................. 381/58

OTHER PUBLICATIONS

TIA/EIA-631-A, Feb. 9, 2001. Telecommunications Telephone Terminal Equipment Radio Frequency Immunity Requirements. Pages 7-10, 25.*

* cited by examiner

*Primary Examiner*—Sinh Tran
*Assistant Examiner*—Walter F Briney, III

(57) ABSTRACT

The present invention is directed to an acoustic signal transfer device for transferring an acoustic signal produced by a telephone handset in a test setup. The device comprises a handset holder, a microphone holder and an acoustic pathway that extends from the handset holder to the microphone holder. The handset holder supports a telephone handset and allows an acoustic signal to travel from the telephone handset to one end of the acoustic pathway. The microphone holder supports a microphone and allows an acoustic signal to travel from a second end of the acoustic pathway to the microphone. A system and method for utilizing the acoustic signal transfer device in a radio frequency immunity test for a telephone are also disclosed.

21 Claims, 4 Drawing Sheets

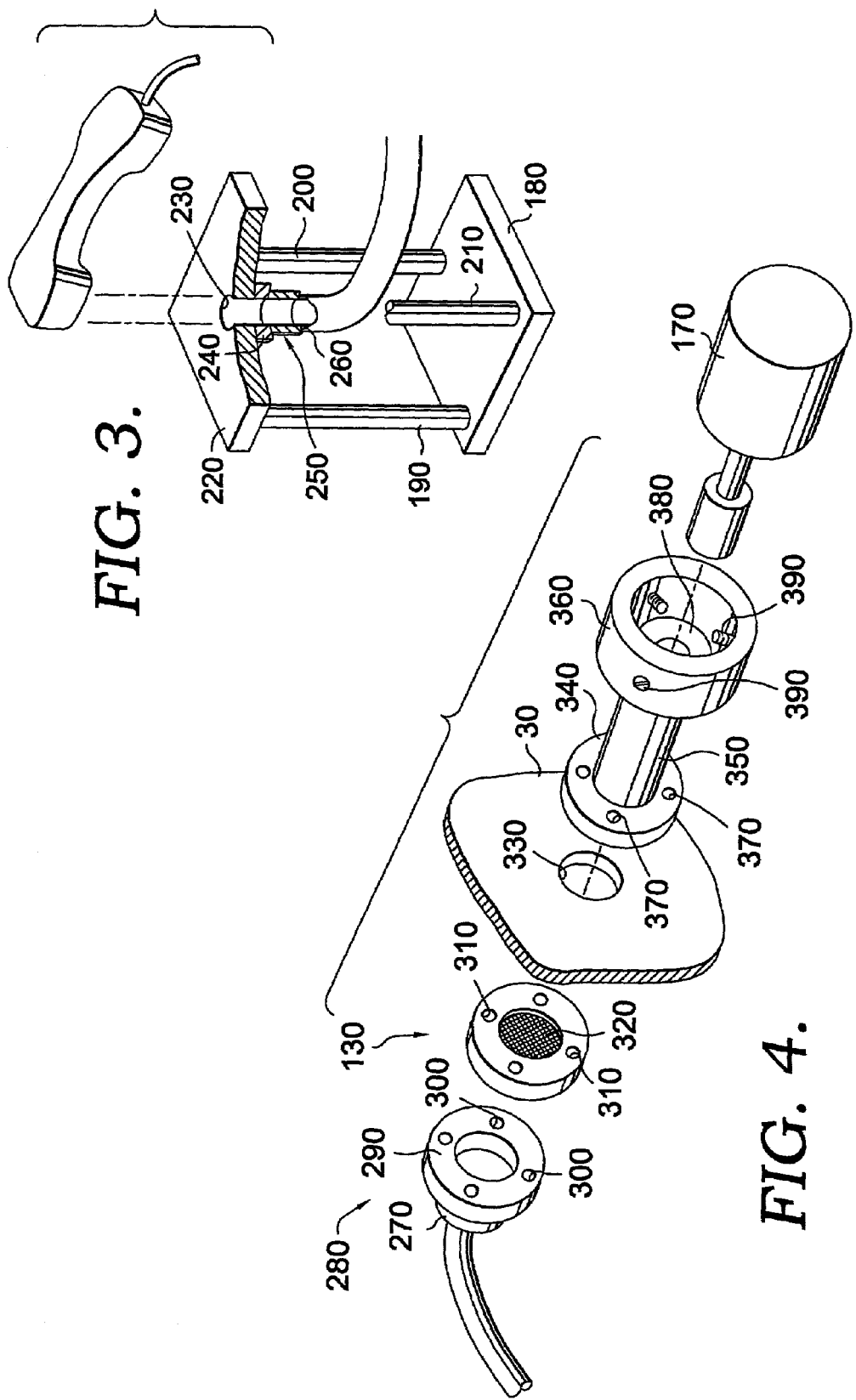

US 6,968,053 B1

ACOUSTIC SIGNAL TRANSFER DEVICE

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

In general, this invention relates to a device for transferring an acoustic signal. More specifically, this invention relates to a device for transferring an acoustic signal produced by a telephone handset during a performance test.

Throughout the environment, radio frequency (RF) signals are present at various strengths. A consumer product will occasionally demodulate these RF signals unintentionally. When the consumer product is a telephone, this unintentional demodulation can cause annoying RF interference, which is defined as performance degradation, malfunction, or equipment failure due to the presence of RF signals.

Telephone designers address the problem of RF interference by attempting to minimize the vulnerability of their product to extraneous radio signals. As telephone designer's efforts in this area have progressed, certain performance criteria have developed, such as the ANSI/TIA/EIA 631 standard. RF immunity is defined as the ability of equipment to meet the performance criteria specified in the presence of RF signals. According to the ANSI/TIA/EIA 631 standard, a telephone has RF immunity if the demodulated acoustic output from the telephone handset does not exceed 55 dBSPL, except in the frequency band from 500 kHz to 2 MHz where the demodulated acoustic output shall not exceed 45 dBSPL, when the telephone is subjected to a radiated electric field having a frequency of 150 kHz to 150 MHz, an unmodulated field strength of 3 VRMS/m, and the modulation of a 1 kHz sinusoidal wave with an 80% amplitude modulation.

Generally, to determine whether a telephone has RF immunity, the telephone is isolated from outside RF signal sources, subjected to an RF field, and the acoustic output from the telephone handset is measured, plotted and displayed. One suggested system and method for conducting such an RF immunity test includes placing the telephone inside an RF chamber, placing a microphone in proximity to the transmitter portion of the telephone handset, and securing the chamber. A signal generator is then used to produce an RF signal that is broadcast on an antenna inside the RF chamber. The microphone detects the acoustic output from the telephone handset, if any, and converts it to an electrical signal that is transferred over a signal lead to a monitoring apparatus.

When the specific system and method described above were used to perform an RF immunity test, the monitoring apparatus displayed an RF interference pattern consistent with the pattern shown in FIG. 6. Clearly, the pattern shown in FIG. 6 has many measurements above 55 dBSPL. However, after analyzing the results and the system and method used to achieve the results, it was determined that a significant portion of the recorded RF interference did not derive from the telephone being tested, but instead was a result of the presence of the microphone inside the RF chamber. Thus, the test system must be changed, altered or modified so that the pattern recorded more accurately reflects the RF interference, if any, of the telephone being tested.

BRIEF SUMMARY OF THE INVENTION

The present invention is directed to an acoustic signal transfer device for transferring an acoustic signal produced by a telephone handset in a test setup. The device comprises a handset holder, a microphone holder and an acoustic pathway that extends from the handset holder to the microphone holder. The handset holder supports a telephone handset and allows an acoustic signal to travel from the telephone handset to one end of the acoustic pathway. The microphone holder supports a microphone and allows an acoustic signal to travel from a second end of the acoustic pathway to the microphone. A system and method for utilizing the acoustic signal transfer device in a radio frequency immunity test for a telephone are also disclosed.

BRIEF DESCRIPTION OF THE SEVERAL VIEWS OF THE DRAWING

The present invention is described in detail below with reference to the attached drawing figures, wherein:

FIG. 3 is a top perspective view of that portion of the acoustic signal transfer device enclosed in circle 3 in FIG. 1 with parts broken away and shown in section to reveal details of the device;

FIG. 4 is an exploded top perspective view of that portion of the radio frequency chamber and acoustic signal transfer device enclosed in circle 4 in FIG. 1;

DETAILED DESCRIPTION OF THE INVENTION

The acoustic signal transfer device described herein may be used to transfer an acoustic signal produced by a telephone handset in a test setup with minimum sound power attenuation. One test setup in which the device finds use is the setup for a radio frequency immunity test. In a radio frequency immunity test, a tester will first isolate the telephone being tested from outside RF signals, such as by placing the telephone in an RF chamber. The tester will then subject the telephone to a radio frequency field and measure the acoustic output from the telephone handset. The acoustic signal transfer device allows the microphone used to detect the acoustic output to be placed some distance away from the telephone so that more accurate results are produced. When a radio frequency chamber is used, the acoustic signal transfer device allows the tester to place the microphone outside of the radio frequency chamber.

Figure 1:
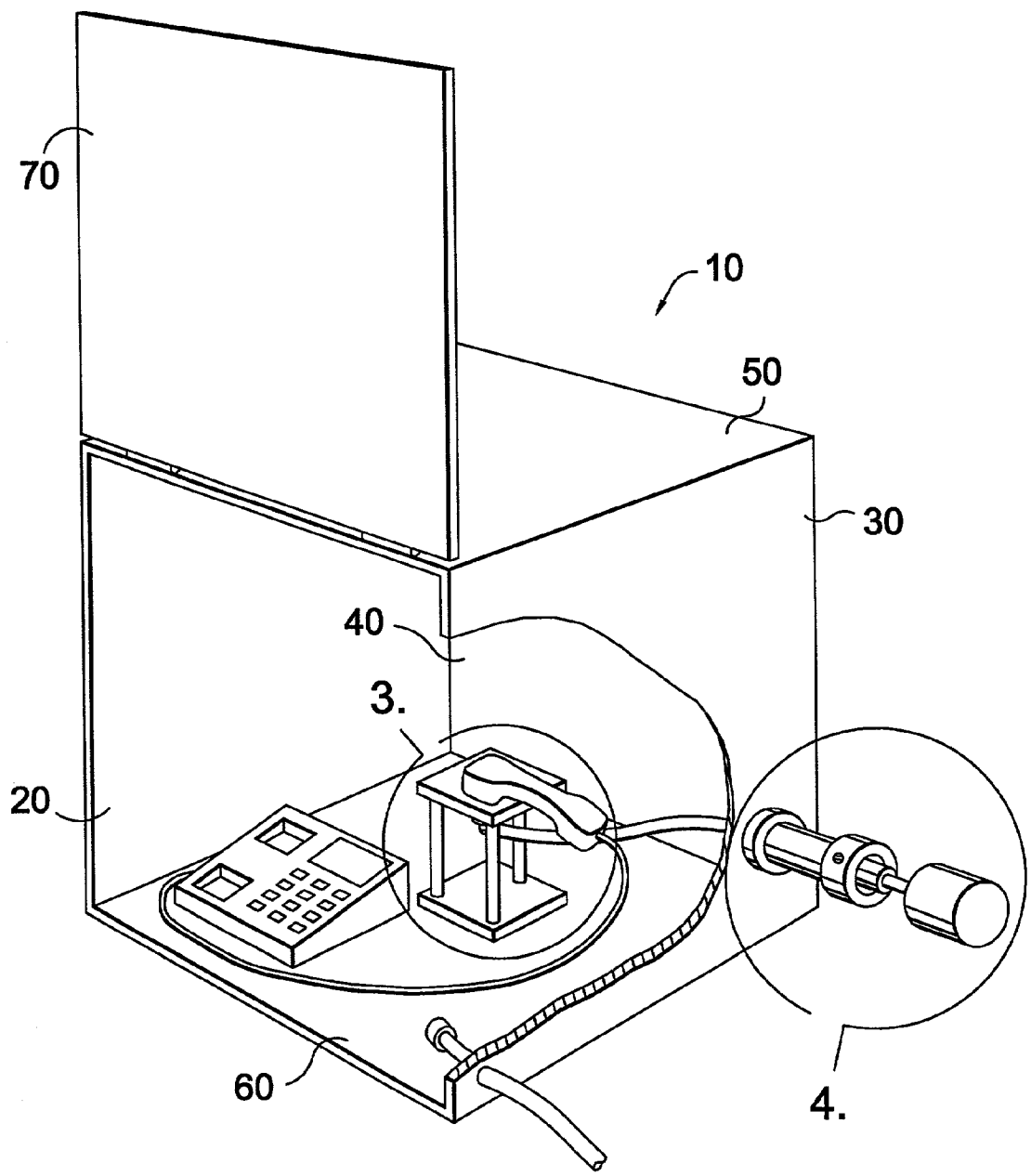
FIG. 1 is a top perspective view of a radio frequency chamber with parts broken away and shown in section to reveal details of the interior of the chamber including a telephone and an acoustic signal transfer device according to the present invention contained therein.

Referring to FIG. 1, a radio frequency chamber is generally denoted by the numeral 10. Radio frequency chambers, such as chamber 10, are well known in the art. Chamber 10 includes a first side wall 20, a second side wall 30, and a back wall 40 each joined to a ceiling 50 and a floor 60. In addition, both first side wall 20 and second side wall 30 are joined to back wall 40. A door 70, which is joined to ceiling 50, provides an opening into chamber 10. In FIG. 1, door 70 is open. When closed, door 70 engages floor 60, first wall 20 and second wall 30, as well as being joined to ceiling 70. When door 70 is closed, chamber 10 is shielded so that radio frequency signals will not propagate from the outside of chamber 10 to the inside or from the inside of chamber 10 to the outside. Shielding material, which is not shown, is attached to that portion of walls 20, 30 and 40, ceiling 50, floor 60 and door 70 inside of chamber 10.

Figure 2:
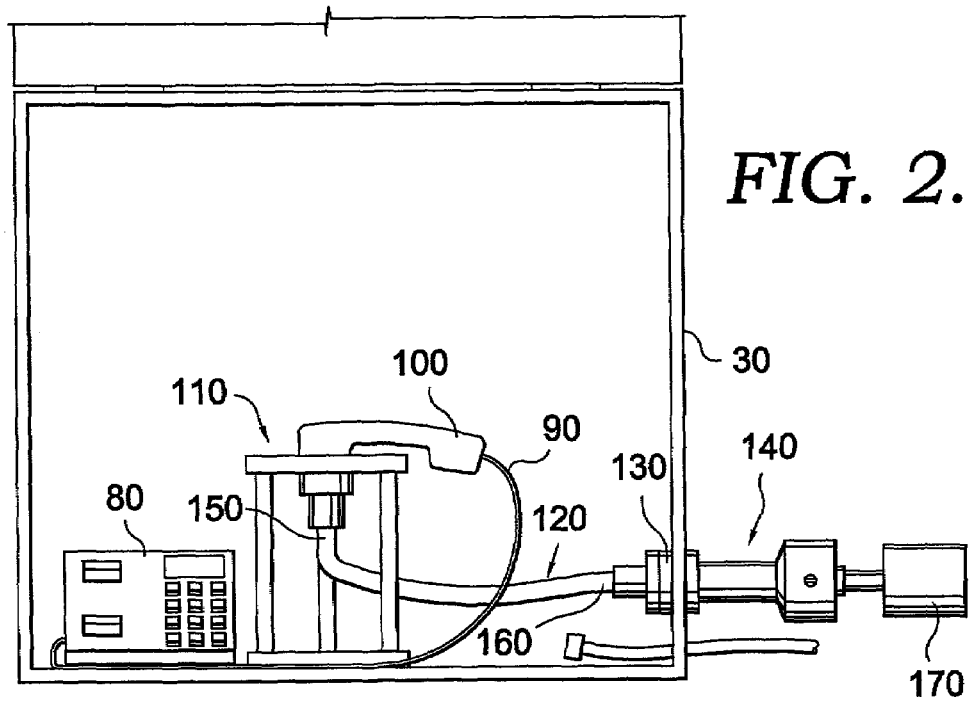
FIG. 2 is a side elevation view of the radio frequency chamber in FIG. 1 containing a telephone and an acoustic signal transfer device according to the present invention.

Referring now to FIG. 2, a telephone comprising a base unit 80, a cord 90 and a handset 100 is positioned inside of chamber 10. Base unit 80 generally contains a keypad and other electrical devices for operating the telephone. Cord 90 connects both to base unit 80 and to handset 100 and provides a path for electrical signals to travel between base unit 80 and handset 100. Handset 100 generally includes a receiver and a transmitter. The receiver converts an acoustic signal received from an outside source into an electrical signal. The transmitter converts an electrical signal received from base unit 80 into an acoustic signal that is broadcast out of handset 100. It should be understood that the telephone shown and described is representative of all two-wire telephone terminal equipment (TTE) having an acoustic output and, therefore, this invention is not limited to a corded digital telephone.

Continuing with FIG. 2, an acoustic signal transfer device generally comprising a handset holder 110, an acoustic tube 120, a radio frequency blocking screen 130, and a microphone holder 140 is also shown. Handset holder 110 receives and supports both handset 100 and a first end 150 of acoustic tube 120. In addition, handset holder 110 provides a pathway for an acoustic signal to travel from handset 100 to first end 150 of acoustic tube 120. A second end 160 of acoustic tube 120 is coupled to radio frequency blocking screen 130, which is located on second side wall 30. Acoustic tube 120 provides a pathway for an acoustic signal to travel from handset holder 110 to blocking screen 130. Microphone holder 140 is located on side wall 30 outside of chamber 10 and is coupled to blocking screen 130. Microphone holder 140 receives and supports a microphone 170 and provides a pathway for an acoustic signal to travel from blocking screen 130 to microphone 170.

Handset holder 110 is shown in greater detail in FIG. 3. A base 180 having a square cross section is located at the bottom of handset holder 110. A first column 190, a second column 200, and a third column 210 are coupled to base 180. A panel 220, which also has a square cross- section, is coupled to the tops of first column 190, second column 200, and third column 210. The combination of base 180 and columns 190,200 and 210 provide support and stability for panel 220. An opening 230 approximately the size of the receiver portion of handset 100 extends through the center of panel 220. Inside of opening 230 is a sealing material (not shown) so that when handset 100 is mounted on handset holder 110, a seal is formed that prevents acoustic signals from propagating into chamber 10. One effective sealing material is rubber, however other sealing materials may be suitable. A first end 240 of an acoustic tube coupler 260 is mounted on the lower side of panel 220 covering opening 230. A second end 260 of acoustic tube coupler 250 is coupled to first end 150 of acoustic tube 120. An acoustic pathway extends through acoustic tube coupler. It should be understood that the ANSI/TIA/EIA 631 standard contains certain requirements regarding the positioning of handset (e.g., the handset shall be supported in such a manner as to allow cord 90 to rise 20 cm above the reference plane). These requirements may determine the size of certain dimensions of handset holder 110, such as the length of columns 210, 220 and 230.

As stated above, acoustic tube 120 provides a pathway from handset holder 110 to radio frequency blocking screen 130, which is located on second side wall 30. Acoustic tube 120 is made of plastic or other material, such as poly vinyl chloride, that will not propagate radio frequency signals. Acoustic tube 120 has an inner diameter of 2.25 centimeters and an outer diameter of 2.5 centimeters. Acoustic tube 120 is 90 centimeters in length so as to prevent the formation of standing waves within the tube. Other lengths will also prevent the formation of standing waves and are included in the scope of this invention. These lengths may be determined, as was the 90 centimeter length, using well known mathematical equations.

Referring now to FIG. 4, second end 160 of acoustic tube 120 terminates inside a first end 270 of a plastic flange 280. First end 270 of plastic flange 280 is a cylinder with an interior diameter slightly larger than the outside diameter of acoustic tube 120. A second end 290 of plastic flange 280 is also a cylinder, but the outside diameter of second end 290 is larger than the outside diameter of first end 270. An acoustic path extends through plastic flange 280. Four mounting holes 300 are located in second end 290. Blocking screen 130 is positioned adjacent to and in contact with second end 290 of plastic flange 280. Blocking screen 130 is a cylinder with an outside diameter that corresponds to the outside diameter of second end 290 and an inside diameter that corresponds to the inside diameter of second end 290. In addition, blocking screen 130 has four mounting holes 300 positioned so as to correspond to mounting holes 300 in second end 290. The inside diameter of blocking screen 130 is covered by a material 320 that blocks radio frequency signals but is acoustically transparent. Such material is well-known in the art. Blocking screen 130 is positioned against the inside of second side wall 30 covering a hole 330 in second side wall 30 corresponding in size to the inside diameter of blocking screen 130.

Continuing with FIG. 4, microphone holder 140 is positioned outside of chamber 10 against second side wall 30 covering hole 330. Microphone holder 140 is comprised of a flange 340, a tube 350 and a microphone coupler 360. Flange 340 is a cylinder with dimensions that correspond to second end 290 of plastic flange 280 and to blocking screen 130. Flange 340 also contains four mounting holes 370 positioned so as to correspond to mounting holes 300 in second end 290 and mounting holes 310 in blocking screen 130. Tube 350 extends from flange 340 to microphone coupler 360. The inside diameter of tube 350 is equal to the inside diameter of flange 340. Microphone coupler 360 is shaped to receive a microphone exemplified by the numeral 170. The inside diameter of microphone coupler 360 is larger than the outside diameter of microphone 170. A rubber grommet 380 is positioned inside of microphone coupler 360. Microphone coupler 360 has three mounting screws 390 positioned around its exterior. Mounting screws 390 extend through microphone coupler 360 so that when microphone 170 is placed within microphone coupler 360, mounting screws 390 terminate against microphone 170.

As part of the initial set up for a radio frequency test, the acoustic transfer device must be installed. First, handset holder 110 is positioned inside of chamber 10 in proximity to the location of the telephone to be tested. Plastic flange 280 is placed against blocking screen 130, blocking screen 130 is placed against the inside of second side wall 30 covering hole 330, and microphone holder 140 is placed against the outside of second side wall 30 also covering hole 330 (see FIG. 4). The mounting holes 300, 310 and 370 are aligned and secured by plastic mounting bolts so that plastic flange 280, blocking screen 130 and microphone holder 140 are connected to second side wall 30. Microphone 170 is then placed within microphone holder 140 and secured by tightening mounting screws 390.

Figure 5:
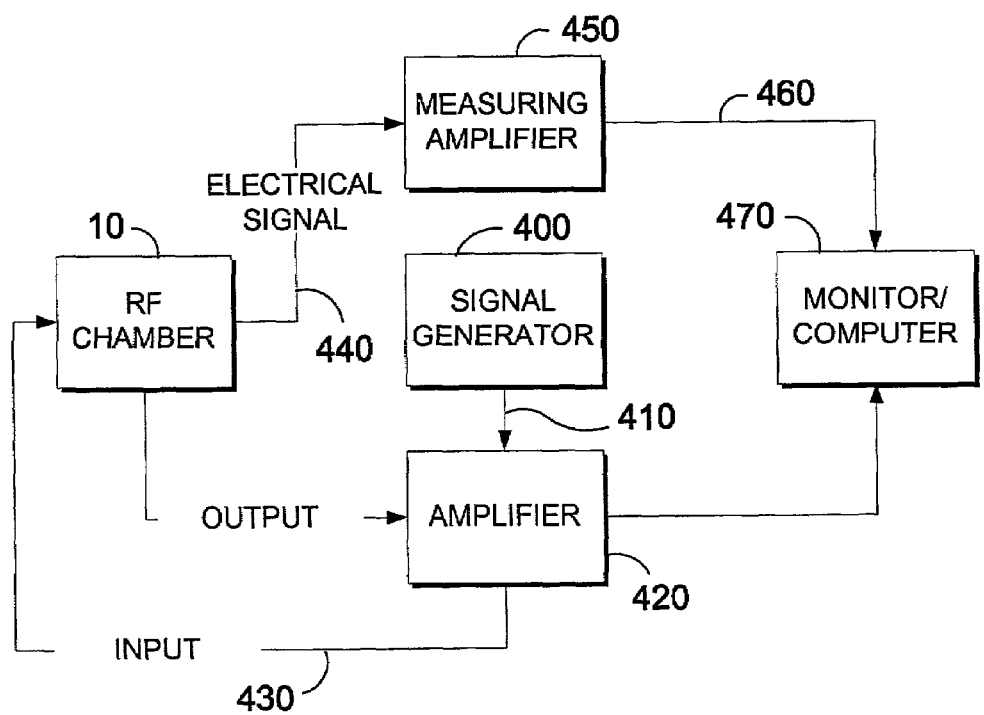
FIG. 5 is a block diagram of the system for testing the radio frequency immunity of a telephone according to the present invention.

A system for testing the radio frequency immunity of a telephone is depicted by the block diagram shown in FIG. 5. The telephone to be tested is placed inside of an RF chamber 10, such as the KeyTek GStrip model RF chamber, and the telephone's handset is placed and secured on the handset holder of an acoustic signal transfer device set up as described above. One method of securing the handset is to bind the handset to the handset holder with a tape or a strap. The strap may include a velcro fastener. The telephone is configured to simulate a real installation as closely as possible. A signal generator 400, such as the Hewlett-Packard model 8648-A, produces an RF signal that is passed across a signal lead 410 to an amplifier 420, such as the Thermo-Voltek GStrip model. Amplifier 420 amplifies the RF signal and then transfers the resulting signal across an input lead 430 that terminates in an antenna inside RF chamber 10. Any acoustic signal produced by the telephone handset is transferred to a microphone, such as the type 4185 manufactured by Brüel and Kjær, connected to the microphone coupler of the acoustic signal transfer device. The signal from the microphone is transferred across a signal lead 440 to a measuring amplifier 450. A model 2610 measuring amplifier manufactured by Brüel and Kjær has been found to work well in this system. Measuring amplifier 450 amplifies the electrical signal and then transfers the resulting signal across a signal lead 460 to a monitor/computer 470 where the signal is sampled, plotted, and displayed. A Dell Optriplex GXM 5133 computer with data acquisition software, such as the Keithly model DAS 1600, and plotting software, such as Microsoft's Excel 6.0, has been successfully used to sample, plot and display the signal produced by a telephone handset in this system. The device names provided above represent devices that have been successfully employed in the test system; other models or other manufacturers' devices may also be used and are included in the scope of this invention.

Figure 6:
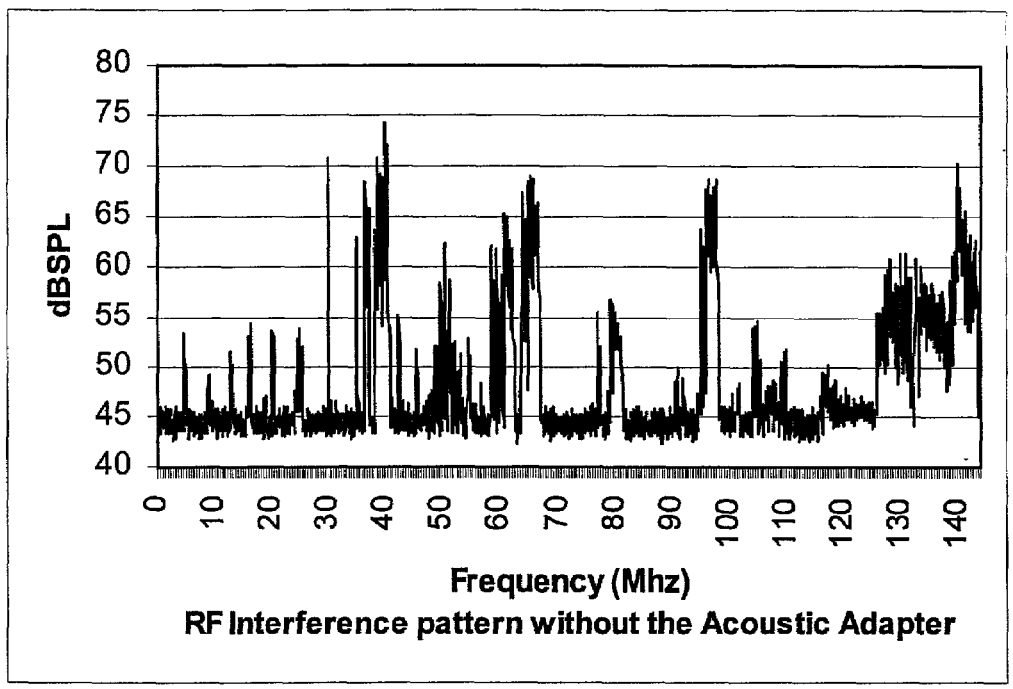
FIG. 6 is a graph of the radio frequency interference pattern of a telephone tested without utilizing an acoustic signal transfer device.
Figure 7:
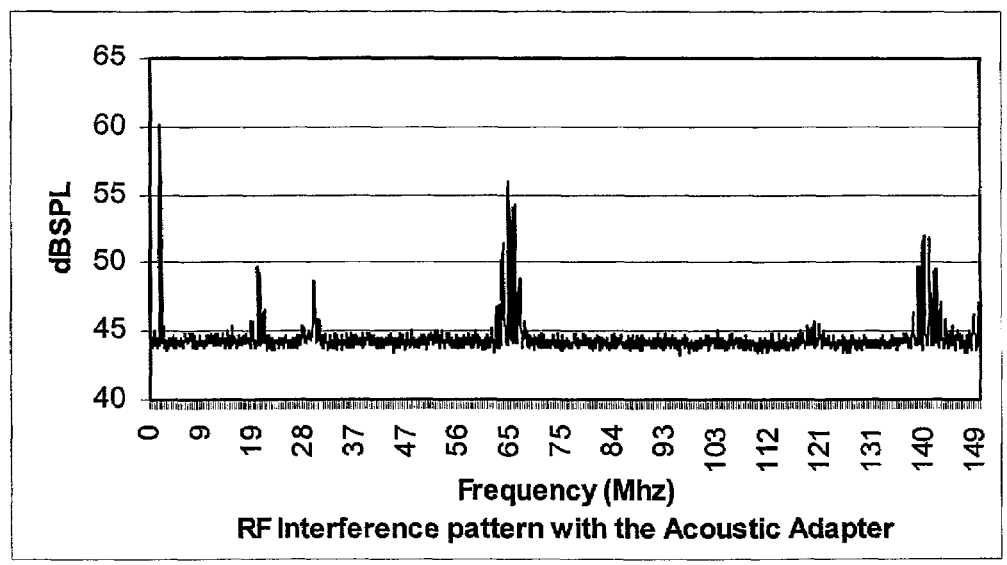
FIG. 7 is a graph of the radio frequency interference pattern of a telephone tested utilizing an acoustic signal transfer device according to the present invention.

In use, the system described above produced a radio frequency interference pattern consistent with the pattern shown in FIG. 7. The benefits of utilizing the acoustic signal transfer device become apparent when the pattern in FIG. 7 is compared to the pattern shown in FIG. 6. Analysis of the output of the handset when the acoustic signal transfer device was utilized confirmed that the output was consistent with the expected output for a given telephone. Thus, employing the acoustic signal transfer device dramatically reduced or eliminated the interference caused by placing the microphone inside the radio frequency chamber thus providing a more accurate test.

It will be appreciated by persons skilled in the art that the present invention is not limited to what has been particularly shown and described hereinabove. Rather, all matter shown in the accompanying drawings or described hereinabove is to be interpreted as illustrative and not limiting. Accordingly, the scope of the present invention is defined by the appended claims rather than the foregoing description.

What is claimed is:

1. An acoustic signal transfer device for transferring an acoustic signal produced by a telephone handset in a test setup to a location removed from said handset, said device comprising:
   a handset holder;
   a microphone holder;
   an acoustic tube coupler coupled to said handset holder;
   an acoustic pathway having an acoustic tube extending from said handset holder; acoustic tube coupler to said microphone holder, said pathway allowing said acoustic signal to be transferred to a location removed from said handset; and
   a radio-frequency-blocking screen having an acoustically transparent, radio-frequency-blocking covering on an inner portion of said screen, said screen positioned between said tube and said microphone holder thereby increasing the accuracy of the test setup.

2. An acoustic signal transfer device as set forth in claim 1 wherein said handset holder further includes a support panel coupled to a plurality of columns extending from a base.

3. An acoustic signal transfer device as set forth in claim 2 wherein said handset holder includes three columns.

4. An acoustic signal transfer device as set forth in claim 1 wherein said handset holder further includes an opening for receiving a transmitter portion of a telephone handset, said opening being one end of said acoustic pathway.

5. An acoustic signal transfer device as set forth in claim 1 wherein said handset holder is made of plastic.

6. An acoustic signal transfer device as set forth in claim 1 wherein said microphone holder includes a microphone coupler.

7. An acoustic signal transfer device as set forth in claim 6 wherein said microphone holder further comprises a flange.

8. An acoustic signal transfer device as set forth in claim 7 wherein said microphone holder further comprises a connecting tube, said tube connected to said flange and to said microphone coupler.

9. An acoustic signal transfer device as set forth in claim 1 wherein said microphone holder is made of metal.

10. An acoustic signal transfer device as set forth in claim 1 wherein said acoustic tube is made of plastic.

11. An acoustic signal transfer device as set forth in claim 1 wherein said acoustic tube is made of poly vinyl chloride.

12. An acoustic signal transfer device as set forth in claim 1 wherein said device transfers an acoustic signal produced by a handset positioned inside a radio- frequency chamber to a microphone positioned outside of said chamber.

13. An acoustic signal transfer device as set forth in claim 1 wherein said device transfers an acoustic signal produced by a handset during a radio-frequency immunity test.

14. An acoustic signal transfer device for transferring an acoustic signal produced by a handset in a test setup to a location removed from said handset, said device comprising:
   a handset holder;
   a microphone holder; and
   an acoustic pathway including an acoustic tube having an inside diameter of about 2.25 centimeters, an outer diameter of about 2.5 centimeters, and extending from said handset holder to said microphone holder, said pathway all owing said acoustic signal to be transferred to a location removed from said handset thereby increasing the accuracy of the test setup.

15. An acoustic signal transfer device for transferring an acoustic signal produced by a telephone handset in a test setup to a location removed from said handset, said device comprising:
- a handset holder;
- a microphone holder;
- an acoustic pathway extending from said handset holder to said microphone holder, said pathway allowing said acoustic signal to be transferred to a location removed from said handset, and
- a radio-frequency-blocking screen, said blocking screen coupled to said acoustic pathway and to said microphone holder, wherein said blocking screen and said microphone holder each have corresponding mounting holes for connecting said blocking screen and said microphone holder to a wall of a chamber.

16. An acoustic signal transfer device for transferring an acoustic signal produced by a telephone handset in a test setup, said device comprising:
- means for receiving and supporting said telephone handset;
- means for receiving and supporting a microphone at a location removed from said handset;
- an acoustic tube coupler coupled to said means for receiving and supporting said handset;
- an acoustic tube coupled between said coupler and said means for receiving and supporting said microphone; and
- a radio-frequency-blocking screen having an inner core of an acoustically transparent, radio-frequency-blocking material coupled between said tube and said means for receiving and supporting said microphone.

17. An acoustic signal transfer device as set forth in claim 16 wherein said means for receiving and supporting said telephone handset is positioned inside of a radio-frequency chamber and said means for receiving and supporting a microphone at a location removed from said handset is positioned outside of said radio-frequency chamber.

18. An acoustic signal transfer device as set forth in claim 16 wherein said means for receiving and supporting said telephone handset comprises a handset holder.

19. An acoustic signal transfer device as set forth in claim 16 wherein said means for receiving and supporting a microphone comprises a microphone holder.

20. A system for testing the radio-frequency immunity of a telephone, said system comprising:
- a radio-frequency chamber;
- a signal generator, said signal generator capable of generating a radio-frequency signal inside of said chamber;
- an acoustic signal transfer pathway, said acoustic signal transfer pathway including a first portion positioned inside of said chamber, said first portion capable of coupling with said telephone, a second Portion Ed coupled to a radio-frequency-blocking screen having an inner core of an acoustically transparent, radio-frequency-blocking material, and a third portion, said third portion positioned outside of said chamber;
- a microphone, said microphone coupled to said third portion of said acoustic signal transfer pathway; and
- a monitoring apparatus coupled to said microphone.

21. A system as set forth in claim 20 wherein said acoustic signal transfer pathway is an acoustic signal transfer device.

* * * * *